United States Patent [19]

Ogawa

[11] Patent Number: 5,724,339
[45] Date of Patent: Mar. 3, 1998

[54] OPTICAL RECORDING MEDIUM HAVING RECORDING PITS OF DIFFERENT SHAPES

[75] Inventor: Masatsugu Ogawa, Tokyo, Japan

[73] Assignee: NEC Corporation, Japan

[21] Appl. No.: 621,478

[22] Filed: Mar. 25, 1996

[30] Foreign Application Priority Data

Mar. 31, 1995 [JP] Japan .................... 7-097610

[51] Int. Cl.⁶ .................................................. G11B 7/24
[52] U.S. Cl. .................................. 369/275.4; 369/275.1
[58] Field of Search .......................... 369/275.4, 275.3, 369/275.1, 275.2, 277, 272, 273

[56] References Cited

U.S. PATENT DOCUMENTS

| | | | |
|---|---|---|---|
| 5,204,852 | 4/1993 | Sakagawa et al. | 369/275.4 |
| 5,357,499 | 10/1994 | Nomoto | 369/275.4 |
| 5,359,591 | 10/1994 | Nomoto | 369/275.4 |
| 5,453,969 | 9/1995 | Psaltis et al. | 369/275.4 |
| 5,471,455 | 11/1995 | Jabr | 369/275.4 |
| 5,528,576 | 6/1996 | Nishikawa | 369/112 |
| 5,559,787 | 9/1996 | Nomoto | 369/275.4 |
| 5,572,508 | 11/1996 | Satoh et al. | 369/275.4 |
| 5,577,016 | 11/1996 | Inagaki et al. | 369/275.4 |

FOREIGN PATENT DOCUMENTS

| | | |
|---|---|---|
| 0545472 | 6/1993 | European Pat. Off. . |
| 0553548 | 8/1993 | European Pat. Off. . |
| 0553573 | 8/1993 | European Pat. Off. . |
| 0594193 | 4/1994 | European Pat. Off. . |
| 0633565 | 1/1995 | European Pat. Off. . |
| 47-26104 | 1/1972 | Japan . |
| 4301245 | 10/1992 | Japan . |

*Primary Examiner*—Tan Dinh
*Attorney, Agent, or Firm*—Hayes, Soloway, Hennessey, Grossman & Hage, P.C.

[57] ABSTRACT

The present invention provides a light-reproduction medium, data stored therein being reproduced by detecting light transmitted therethrough and/or light reflected therefrom, including (a) a substrate formed on a surface thereof with at least two recording pits having different level from the surface of the substrate, each of the recording pits having a cross-section selected from at least two different shapes, the cross-section being defined as viewed in a direction perpendicular to a direction in which the light-reproduction medium is moved relative to an optical head, and (b) a magnetic film formed on the surface of the substrate. The present invention provides high density without improving mastering technology. That is, the present invention provides a light-reproduction medium having memory density several times greater than a conventional CD-ROM without changing CD-ROM fabrication technique, driving method and an optical head structure, resulting in significantly increased capacity of an optical disc or an optical card.

9 Claims, 12 Drawing Sheets

CENTER OF MEDIUM →

CENTER OF MEDIUM →

CENTER OF MEDIUM →

CENTER OF MEDIUM →

OPTICAL RECORDING MEDIUM HAVING RECORDING PITS OF DIFFERENT SHAPES

BACKGROUND OF THE INVENTION

1. Field of the Invention

The invention relates to a light-reproduction medium such as an optical disc and an optical card to be used to reproduce data stored therein by projecting lights thereto and analyzing lights reflected therefrom. The invention is also related to a method of reproducing data stored in a light-reproduction medium, and a reproduction apparatus for reproducing data stored in a light-reproduction medium. In particular, the invention relates to a light-reproduction medium capable of accomplishing highly densified recording.

2. Description of the Related Art

Various attempts have been made to highly densify a light-reproduction medium such as CD-ROM which is an optical disc used only for data regeneration. An example of CD-ROM is illustrated in FIGS. 1A and 1B which a plan view of a part thereof and a cross-sectional view taken along the line B1—B1 in FIG. 1A. As illustrated, CD-ROM comprises a substrate 1 formed on a surface thereof with a plurality of recessed portions each of which acts as a recording pit 2, and a reflection film 7 covering the surface of the substrate 1. In operation, lights are projected to the surface of the substrate 1 with one of an optical head or the CD-ROM being moved in a direction indicated with an arrow Y, and lights reflected from the substrate 1 are detected. Then, the reflected lights are detected to thereby identify recessed or raised portions of the surface of the substrate 1 of which the recording pit 2 is constituted. The thus detected light intensity is converted into signals, and thus data stored in the CD-ROM are reproduced. Hereinbelow, though not explained each time, an optical disc such as CD-ROM is to be moved relative to an optical head between a top and a bottom of a figure, namely in a direction indicated with the arrow Y in FIG. 1A, for instance.

For fabrication of such CD-ROM as above mentioned, there is used a basic pattern board called a stamper which is formed on a surface thereof with recessed and raised portions acting as recording pits storing data therein. By injection mold technology, the recessed and raised portions are copied on a polycarbonate substrate, and then a reflection film composed of metal such as aluminum is deposited on the polycarbonate substrate. The stamper is fabricated with exposure technology called mastering, and hence, the memory density of CD-ROM is determined in dependence on how fine recording pits can be fabricated with the mastering.

In order to meet the demand of highly densified light-reproduction medium in these days, it has been proposed as one solution to fabricate a recording pit in smaller size. To this end, it is necessary to fabricate the recessed and raised portions of the stamper in smaller size, which in turn requires a smaller-sized mastering. However, there is a limitation in reduction of size of a mastering, and hence it is almost impossible to fabricate a higher density light-reproduction medium. Thus, a new technique for producing a higher density light-reproduction medium is necessary to be developed in place of the mastering.

For instance, Japanese Unexamined Patent Publication No. 47-26104, which is based on Dutch application No. 7103233 filed on Mar. 11, 1971, has suggested a circular disc shaped data carrier which contains aural and video signals encoded to optical signs or which contains the aural and video signals in swirl arrangement, and also has suggested a reader for the data carrier.

SUMMARY OF THE INVENTION

It is an object of the present invention to provide a light-reproduction medium having higher density thereof without necessitating improving mastering technology.

It is also an object of the present invention to provide a method of reproducing data stored in a light-reproduction medium, and a reproduction apparatus for reproducing data stored in a light-reproduction medium both without improving mastering technology.

In one aspect, the present invention provides a light-reproduction medium, data stored therein being reproduced by detecting light transmitted therethrough and/or light reflected therefrom, the light-reproduction medium including a substrate formed on a surface thereof with at least two recording pits having different level from the surface of the substrate, each of the recording pits having a cross-section selected from at least two different shapes, the cross-section being defined as viewed in a direction perpendicular to a direction in which the light-reproduction medium is moved relative to an optical head, and a magnetic film formed on the surface of the substrate.

It is possible to detect a difference in cross-sectional shape by utilizing mutually perpendicular polarized lights, thereby increasing multiplicity of stored data and accomplishing higher densification.

For instance, the shapes of the cross-section include a rectangle, a V-shape, and a shape intermediate between rectangle and V-shape. Thus, if two recording pits are to be formed, one of them has a rectangular cross-section, and the other have a V-shaped cross-section or a shape intermediate between a rectangle and a V-shape.

The present invention further provides a light-reproduction medium, data stored therein being reproduced by detecting light transmitted therethrough and/or light reflected therefrom, the light-reproduction medium including a substrate formed on a surface thereof with at least two recording pits having different level from the surface of the substrate, each of the recording pits having a width selected from at least two different ones, the width being defined as viewed in a direction perpendicular to a direction in which the light-reproduction medium is moved relative to an optical head, and a magnetic film formed on the surface of the substrate.

It is possible to detect a difference in width by utilizing mutually perpendicular polarized lights, thereby increasing multiplicity of stored data and accomplishing higher densification.

For instance, the width may be determined to be greater than one half of an incident light wavelength or smaller than one half of an incident light wavelength.

The present invention still further provides a light-reproduction medium, data stored therein being reproduced by detecting light transmitted therethrough and/or light reflected therefrom, the light-reproduction medium including a substrate formed on a surface thereof with at least two recording pits having different level from the surface of the substrate, each of the recording pits having a cross-section selected from at least two different shapes, the cross-section being defined as viewed in a direction perpendicular to a direction Y in which the light-reproduction medium is moved relative to an optical head, at least two recording pits among the recording pits being asymmetrical in shape about an axis passing through a midpoint thereof and parallel to the direction Y.

It is possible to detect a difference in cross-sectional shape by measuring received light intensity at both sides facing the axis, thereby increasing multiplicity of stored data and accomplishing higher densification.

As an example of an asymmetrical cross-section, the recording pit may have a cross-section having an upper edge inclined upward or downward towards a center of the light-reproduction medium.

The present invention yet further provides a light-reproduction medium, data stored therein being reproduced by detecting light transmitted therethrough and/or light reflected therefrom, the light-reproduction medium including a substrate formed on a surface thereof with at least two recording pits having different level from the surface of the substrate, each of the recording pits having a cross-section selected from at least two different shapes, the cross-section being defined as viewed in a direction Y perpendicular to a direction in which the light-reproduction medium is moved relative to an optical head, each of the recording pits having a width selected from at least two different ones, the width being defined as viewed in the direction Y, at least two recording pits among the recording pits being asymmetrical in shape about an axis passing through a midpoint thereof and parallel to the direction Y, and a magnetic film formed on the surface of the substrate.

It is possible to detect a difference in cross-sectional shape and width, thereby further increasing multiplicity of stored data and accomplishing further higher density.

In the above mentioned light-reproduction medium, the recording pits are shaped in a groove or a land. In addition, the substrate may be formed on a is surface thereof with second lands and/or grooves in a region in which the recording pits are not formed in a conventional substrate. The second lands and/or grooves extend in a direction in which the light-reproduction medium is moved relative to an optical head, and have a different level from the recording pits. It is preferable that each of the second lands or grooves is continuous with each of the recording pits. Furthermore, each of the second lands or grooves may have a width varying in a direction in which the light-reproduction medium is moved relative to an optical head and having a different level from the recording pits.

The present invention still yet further provides a light-reproduction medium, data stored therein being reproduced by detecting light transmitted therethrough and/or light reflected therefrom, the light-reproduction medium including a substrate formed on a surface thereof with at least one recording pit having different level from the surface of the substrate, the substrate being formed on a surface thereof with second lands or grooves in a region in which the recording pits are not formed in a conventional substrate, the second lands or grooves extending in a direction in which the light-reproduction medium is moved relative to an optical head and having a different level from the recording pits.

It is possible to increase multiplicity in a region where recording pits are not formed in a conventional substrate, thereby accomplishing higher density.

The second lands or grooves may have a width varying in the above mentioned direction. A depth or height of the recording pits and the surface of the substrate may be ⅛ to ¼ of a wavelength of an incident light or ⅛ to ¼ of a wavelength of an incident light plus an integral number of said wavelength. In such a case, it is preferable that the second lands or grooves have a depth or height equal to ¹⁄₁₀ to ¹⁄₃₀ of a wavelength of an incident light or an integral number multiplied by ¼ of a wavelength of an incident light.

In another aspect of the present invention, the present invention provides a method of reproducing data stored in a light-reproduction medium, including the steps of (a) projecting mutually perpendicularly intersected polarized lights to a light-reproduction medium including a substrate formed on a surface thereof with recording pits having different level from the surface of the substrate, and a magnetic film covering the recording pits therewith, each of the recording pits having a cross-section and a width, at least one of the cross-section and width being selected from at least two different ones, the cross-section and width being defined as viewed in a direction B perpendicular to a direction Y in which the light-reproduction medium is moved relative to an optical head, and (b) reproducing data from polarized lights reflected from or transmitted through the light-reproduction medium.

The step (a) preferably includes the step of concurrently projecting s- and p-polarized lights. The step (b) preferably includes the steps of decomposing the polarized lights into components parallel to the directions A and B, and calculating a difference between the components. It is preferable that one of the polarized lights is angled by 45 degrees relative to the direction Y.

In still another aspect, the present invention provides a light-reproduction apparatus for reproducing data stored in a light-reproduction s medium by projecting a light into the light-reproduction medium and receiving a light from the light-reproduction medium, the apparatus including (a) an objective lens disposed in facing relation to the light-reproduction medium, (b) a polarized-beam splitter disposed farther away from the light-reproduction medium than the objective lens, and (c) a half-wave plate disposed between the objective lens and the polarized-beam splitter. Mutually perpendicularly intersected polarized lights are to be projected to the light-reproduction medium through the half-wave plate.

The light-reproduction apparatus may further include first and second photodetectors divided into two sections in a direction R in which the light-reproduction medium is moved relative to an optical head. The light-reproduction apparatus may still further include (a) an optical system for dividing lights coming from the light-reproduction medium into components S and P parallel to the direction R and perpendicular to the direction R just prior to incidence of the lights into the photodetectors, each of the first and second photodetectors being divided into first and second sections at a midpoint thereof, the first and second photodetectors detecting the components S and P, respectively, the first photodetector transmitting an output A when receiving a light coming from a region closer to a center of the light-reproduction medium and transmitting an output B when receiving a light coming from a region more remote from the center, the second photodetector transmitting an output C when receiving a light coming from a region closer to the center and transmitting an output D when receiving a light coming from a region more remote from the center, and (b) a processor for processing the outputs to transmit a reproduction signal representing one of (A+B)−(C+D), (A+C)−(B+D) and (A+B+C+D).

The inventor has found that if polarized lights are projected to a groove or a land composed of magnetic substance, the reflected lights have peculiar characteristics. On the assumption that when polarized Gaussian beam is projected to magnetic substance having a groove or a land formed thereon, an intensity of lights scattered from the magnetic substance is represented with R, and Kerr rotation angle is represented with θ, FIG. 2 shows the dependency of a product Rθ on a shape of the groove or land. Hereinbelow, the term "a cross-section of a groove or a land" means a cross-section of a recording pit as viewed in a direction perpendicular to a direction in which a light-reproduction medium is moved relative to an optical head.

As illustrated with an axis of abscissa in FIG. 2, it is assumed that a cross-section of a groove or a land is varied from a V-shape to a rectangle. A left end of the abscissa indicates a V-shape, and a right end indicates a rectangle. A groove or a land comprises an inclined portion and a flat portion. The axis of abscissa in FIG. 2 indicates a half width of the flat portion when an entire width of a groove or land of which the recording pit is constituted is fixed. The data shown in FIG. 2 are those obtained when a groove or land is relatively wide, namely when a width of a groove or land of a recording pit is twice as long as a wavelength of an incident light. It is understood in FIG. 2 that a product $R\theta$ is quite different in dependence on s-polarization, p-polarization, incidence to a land, or incidence to a groove when the groove or land is not rectangular in shape. On the other hand, it is also understood that a product $R\theta$ remains almost the same when the groove is rectangular in shape. Herein, an orientation of s-polarization means a direction parallel to the groove or land, whereas an orientation of p-polarization means a direction perpendicular to the groove or land.

In view of the above mentioned phenomenon, it is understood that it is possible to detect whether a recording pit is constituted of a rectangular or V-shaped groove or land by concurrently radiating s- and p-polarized lights to a magnetic substance having recessed and raised portions, and calculating a difference between outputs. When a recording pit has a rectangular cross-section, a differential output is zero, whereas when a recording pit has a V-shaped cross-section, a differential output is a certain finite value. The concurrent radiation of s- and p-polarized lights means radiation of polarized lights oriented to a direction other than a direction parallel or perpendicular to a direction in which a light-reproduction medium is moved relative to an optical head. Hereinbelow, a direction in which a light-reproduction medium is moved relative to an optical head is referred to simply as a direction Y. An incidence angle of polarized lights is preferably 45 degrees relative to the direction Y. Thus, it is possible to obtain doubled multiplicity of a recording pit by additionally forming a magnetic film on a substrate fabricated in accordance with a conventional CD-ROM fabrication method, and forming the substrate with two types of recording pits, namely one having a rectangular cross-section and one having a V-shaped cross-section.

FIG. 3 illustrates the same phenomenon as FIG. 2. However, the data shown in FIG. 3 are those obtained when a groove or land of a recording pit is relatively narrow, namely when a width of a groove or land is equal to about ½ of a wavelength of an incident light. The trend in FIG. 3 is essentially different from the trend in FIG. 2 in that a product $R\theta$ is different in dependence on s-polarization, p-polarization, incidence to a land, or incidence to a groove even when the groove or land is rectangular in shape.

In view of this fact, it is understood that a width of a groove or land can be detected as to whether it is large or small by concurrently radiating s- and p-polarized lights and measuring a difference in outputs when a recording pit has almost rectangular cross-section. That is, if a width of a groove or land is large relative to a wavelength of an incident light, a differential output is equal to zero or almost zero, as illustrated in FIG. 2, whereas if a width of a groove or land is small relative to a wavelength of an incident light, a differential output is equal to a certain finite value, as illustrated in FIG. 3. In general, it is preferable that one of grooves or lands have a width greater than ½ of a wavelength of an incident light, and the other have a width smaller than ½ of a wavelength of an incident light. Thus, it is possible to obtain doubled multiplicity in a recording pit by additionally forming a magnetic film on a substrate such as conventional CD-ROM, and varying a width of a recording pit to be greater or smaller than a threshold value.

If a recording pit formed on a substrate such as conventional CD-ROM without the above mentioned magnetic substance is formed to have a cross-section which is asymmetrical about an axis passing through a midpoint of the recording pit and parallel to the direction Y, quantity of reflected lights is also asymmetrical about the axis. Hence, a combination of a recording pit having an asymmetrical cross-section and another recording pit having a cross-section obtained by rotation of the former recording pit by 180 degrees about an axis thereof provides a pair of recording pits having different symmetry with respect to reflected light quantity.

Accordingly, it is possible to identify two different recording pits by using a photodetector divided into two sections in a direction parallel to the above mentioned axis, and measuring a difference between these two sections. This means that the multiplicity of a recording pit is doubled.

Thus, it is possible to increase the multiplicity of a recording pit or recording pits in the above mentioned ways, however, a region where a recording pit or recording pits is (are) not formed remains having the multiplicity of one (1). In order for such a region to have an increased multiplicity and maintain a difference from a recording pit in quantity of reflected lights, it is necessary for such a region to have a groove or land which has the same configuration as a recording pit and which is much shallower or lower than a recording pit, or have a groove or land which has the same configuration as a recording pit and which has depth or height equal to several times a wavelength of an incident light multiplied by ¼. Since a very shallow groove and low land have almost the same reflection intensity as a flat surface, they do not lose a difference from a recording pit in quantity of reflected lights. A groove or land having depth or height equal to k-number (k is an integer greater than 1) times ¼ of a wavelength of an incident light would have reflection intensity of almost zero when k is an odd number, but would have the same reflection intensity as a flat groove or land when k is an even number. Thus, the groove or land would not lose a difference from a recording pit in reflection intensity.

Accordingly, the formation of a groove or land in a region in which a recording pit or recording pits is (are) not formed in a conventional substrate in accordance with the above mentioned conditions increases the multiplicity in such a region with a difference from a recording pit or recording pits in quantity of reflected lights being maintained. Thus, it is possible to increase memory density by t-number times relative to conventional CD-ROM (t is equal to the number corresponding to the multiplicity).

Among various optical systems for reproducing data stored in a light-reproduction medium, an optical system which is of a type measuring a difference between s- and p-polarized lights can divide lights into s-polarization and p-polarization, for instance, by disposing a half-wave plate between an objective lens constituting a part of a reproduction optical system of a conventional optical magnetic disc medium and a polarized-beam splitter disposed closest to the objective lens. In addition, if only a conventional photodetector for regeneration is divided into two sections, it is possible to read out data stored in asymmetrically shaped recording pits.

In addition, the disposition of a half-wave plate is compatible with the division of a photodetector. When both a half-wave plate and an optical system including a polarized-beam splitter for dividing lights into s- and p-polarized lights are used, in general, two photodetectors are used. In such a case, each of the photodetectors is divided into two sections in the direction Y. When an optical system including a Wollaston prism for dividing lights into s- and p-polarized lights is to be used, a single photodetector is used. In such a case, the photodetector is divided into four sections in the direction Y.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1A:
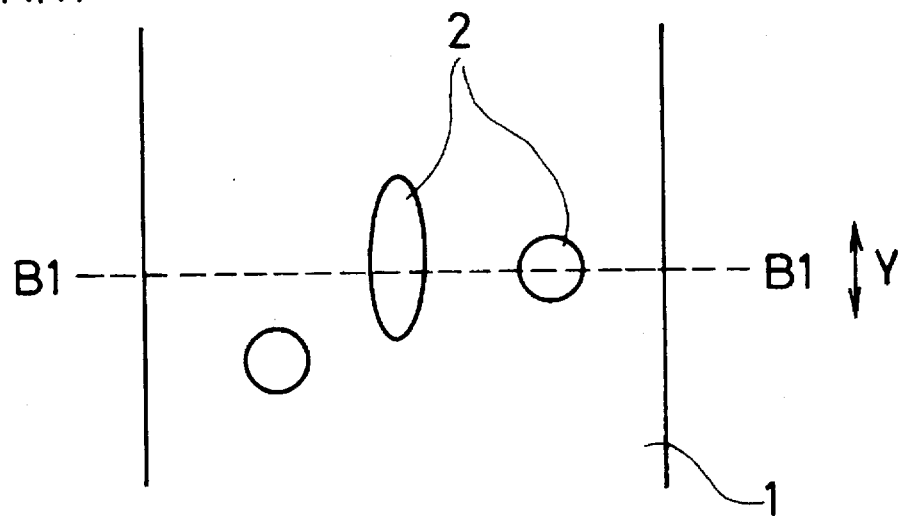
FIG. 1A is a plan view illustrating conventional CD-ROM.
Figure 1B:
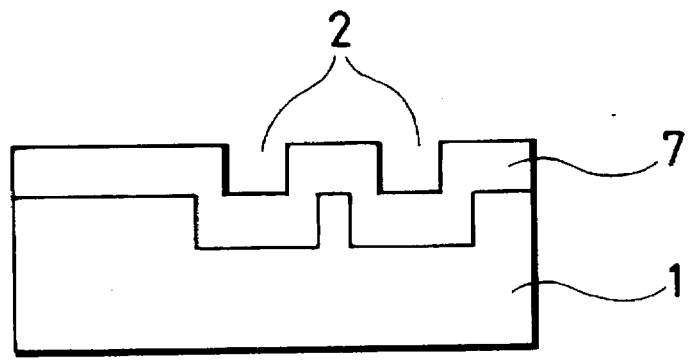
FIG. 1B is a cross-sectional view taken along the line B1—B1 in FIG. 1A.

Preferred embodiments in accordance with the present invention will be explained hereinbelow with reference to drawings.

Hereinbelow will be explained the first embodiment with reference to FIGS. 4A and 4B. A substrate 1 is formed on a surface thereof with recording pits 2a and 2b, similarly to conventional CD-ROM. The recording pits 2a and 2b have different length in a direction Y in which a light-reproduction medium is moved relative to an optical head. On the surface of the substrate 1 are deposited a dielectric film 3, a magnetic film 4 and a dielectric film 5 in this order and such that thicknesses of the films 3, 4 and 5 do not change a cross-sectional shape of the recording pits 2a and 2b. Although the recording pits 2a and 2b are shaped into grooves in the following description, the recording pits may be shaped into lands.

Although the single magnetic film 4 is sandwiched between upper and lower dielectric films 3 and 5, there may be formed multi-layered magnetic films. The magnetic film 4 may be deposited directly on the substrate 1. As an alternative, a reflection film (not illustrated) may be deposited on the uppermost film or dielectric film 5. The magnetic film 4 may be composed of amorphous alloy including rare earth metals and iron family transition metals, periodical multi-layered film comprising iron family transition metals and noble metals, MnBi alloy, or oxide magnetic substance. It is in particular preferable to use a film composed mainly of TbFeCo. It is also preferable for the magnetic film 4 to contain at least one element having corrosion resistance such as Ti, Cr, Ni, Ta and Pt. The substrate 1 may be made of either synthetic resin such as polycarbonate and acrylic resin or glass. As an alternative, the substrate 1 may be covered with such synthetic resin or glass. The substrate 1 is preferably shaped into a disc or card.

The recording pit 2a has a rectangular cross-section. The recording pit 2b has greater length than the recording pit 2a, extending parallel to the direction Y, and has a V-shaped cross-section which is symmetrical about an axis extending perpendicularly to the direction Y. In addition, second grooves 6 are formed on a surface of the substrate 1 in a region where the recording pits 2a and 2b are not formed. The second grooves 6 are shallower than the recording pits 2a and 2b, and extend in parallel with the direction Y.

Figure 4A:
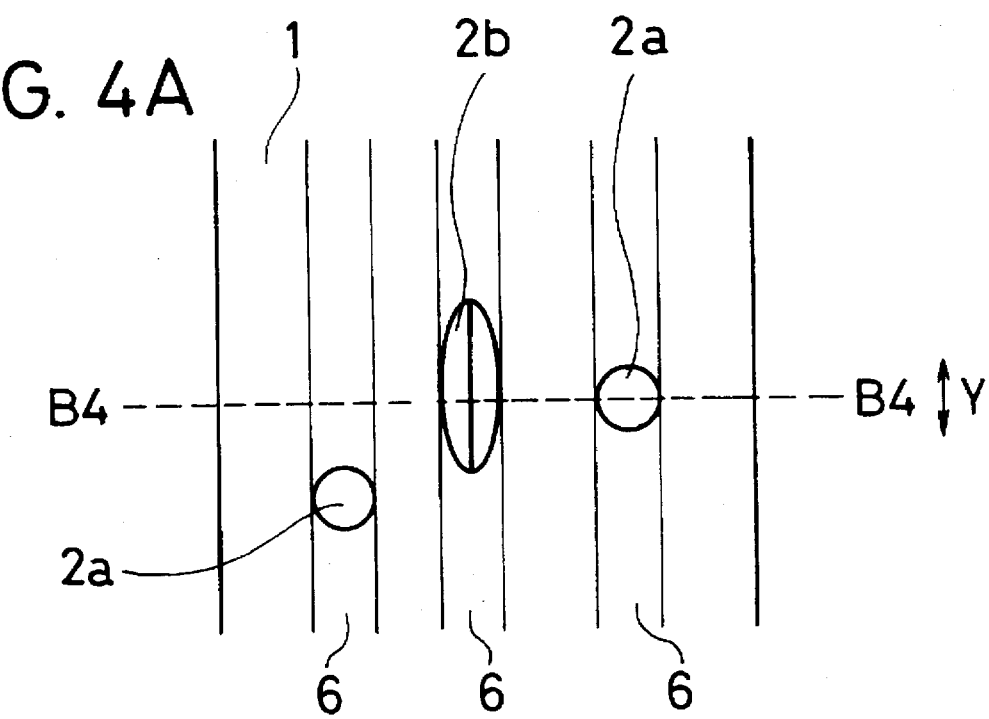
FIG. 4A is a plan view illustrating recording pits made in accordance with the first embodiment of the present invention.
Figure 4B:
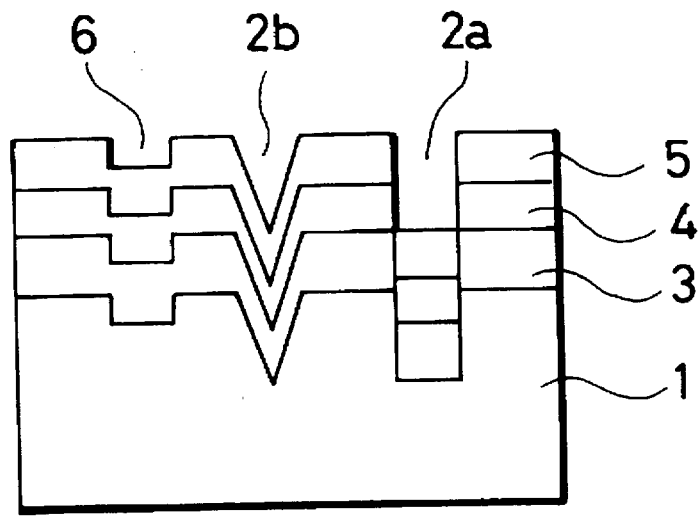
FIG. 4B is a cross-sectional view taken along the line B4—B4 in FIG. 4A.
Figure 5:
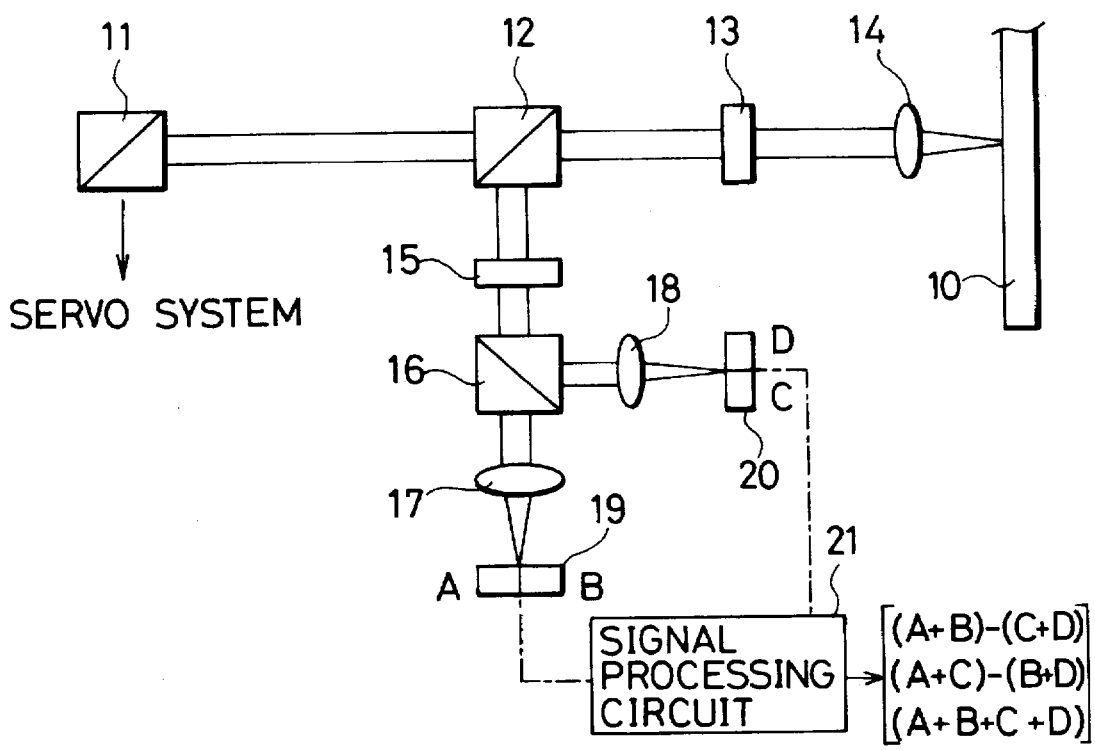
FIG. 5 is a schematic view illustrating a configuration of a light-reproduction apparatus made in accordance with the present invention.

FIG. 5 illustrates a light-reproduction apparatus for reproducing the light-reproduction medium illustrated in FIGS. 4A and 4B. The light-reproduction apparatus comprises (a) a first polarized-beam splitter 11 for receiving a laser beam from a light source (not illustrated) and splitting the received laser beam into two beams, (b) a second polarized-beam splitter 12 for receiving a split beam from the first polarized-beam splitter and further splitting it into two beams, (c) an objective lens 14 disposed in facing relation to a light-reproduction medium 10, (d) a half-wave plate 13 disposed between the second polarized-beam splitter 12 and the objective lens 14, (e) a third polarized-beam splitter 16 for receiving a split beam from the second polarized-beam splitter 12 and further splitting it into two beams to transmit them to photodetectors, (f) a second half-wave plate 15 disposed between the second polarized-beam splitter 12 and the third polarized-beam splitter 16, (e) first and second photodetectors 19 and 20 for receiving split beams from the third polarized-beam splitter 16, (f) lenses 17 and 18 each disposed between the third polarized-beam splitter 16 and the first and second photodetectors 19 and 20, and (g) a signal processing circuit 21 for processing signals transmitted from the first and second photodetectors 19 and 20.

In operation, a laser beam emitted from a light source is projected to a surface of the light-reproduction medium 10 through the first and second polarized-beam splitters 11 and 12, the half-wave plate 13 and the objective lens 14. The light reflected from the light-reproduction medium 10 passes through the objective lens 14 and the half-wave plate 13, and then is split into two beams in the second polarized-beam splitter 12. The thus split beam passing through the second polarized-beam splitter 12 is transmitted to a servo system through the first polarized-beam splitter 11. The other split beam passes through the second half-wave plate 15, and is further split by the third polarized-beam splitter 16. The thus split beams pass through the lenses 17 and 18 to and are detected by the first and second photodetectors 19 and 20 each of which is divided at a center thereof into two sections.

The light-reproduction apparatus illustrated in FIG. 5 is characterized by the half-wave plate 13 in comparison with a conventional light-reproduction apparatus. The half-wave plate 13 changes polarization of light into linear polarization oriented in a direction other than direction parallel or perpendicular is to a direction Y in which the light-reproduction medium 10 is moved relative to the illustrated light-reproduction apparatus. In this embodiment, the half-wave plate 13 changes polarization of light into linear polarization angled by 45 degrees to the direction Y, and causes s- and p-polarized lights to enter onto the light-reproduction medium 10.

The light reflected from the light-reproduction medium 10 is changed into polarization in which the light is emitted by the half-wave plate 13. Then, the linearly polarized-light is split into s-polarized light and p-polarized light by the third polarized-beam splitter 16. The thus split lights enter first and second the photodetectors 19 and 20.

Thus, the first photodetector 19 detects p-polarized light, whereas the second photodetector 20 detects s-polarized light. As mentioned earlier, each of the first and second photodetectors 19 and 20 is divided into two sections corresponding to a region closer to a center of the light-reproduction medium and a region farther away from a center of the light-reproduction medium, respectively. Hence, the first photodetector 19 outputs a signal A to the signal processing circuit 21 when p-polarized light is detected at the region of the light-reproduction medium 10 closer to a center thereof, and also outputs a signal B to the signal processing circuit 21 when p-polarized light is detected at the regions of the light-reproduction medium 10 farther away from a center thereof. Similarly, the second photodetector 20 outputs a signal C to the signal processing circuit 21 when s-polarized light is detected at a region of the light-reproduction medium 10 closer to a center thereof, and also outputs a signal D to the signal processing circuit 21 when s-polarized light is detected at the regions of the light-reproduction medium 10 farther away from a center thereof. The signal processing circuit 21 receives the signals A, B, C and D, and carry out calculations in accordance with the following equations: $(A+B)-(C+D)$, $(A+C)-(B+D)$ and $(A+B+C+D)$. The data stored in the light-reproduction medium 10 can be obtained from the results of the calculations.

Thus, similar to conventional CD-ROM, the light-reproduction apparatus can reproduce data stored in the light-reproduction medium 10 in dependence on a length of the recording pits 2a and 2b in the direction Y by calculating $(A+B+C+D)$ based on the outputs transmitted from the first and second photodetectors 19 and 20.

Furthermore, the difference in cross-sectional shape between the recording pit 2a having a rectangular cross-section and the recording pit 2b having a V-shaped cross-section makes it possible to reproduce data in accordance therewith. It is possible to identify cross-section of the recording pits 2a and 2b as to whether they are rectangle or V-shape by calculating a difference between s- and p-polarized lights in accordance with the equation: $(A+B)-(C+D)$. Thus, the multiplicity of the recording pits can be increased also by the difference in a cross-sectional shape between the recording pits 2a and 2b. Accordingly, even if there are formed recording pits having the same size as conventional ones, it is possible to double the multiplicity of both the recording pits and a region in which the recording pits are not formed. As a result, it is possible to have two times greater multiplicity in a light-reproduction medium.

In place of the third polarized-beam splitter 16 a Wollaston prism may be used, in which case two photodetectors are used in juxtaposition or there is used a photodetector divided into four sections in the direction Y. As an alternative, a hologram device may be substituted for such a photoelement in order to make the size of an optical head more compact. In addition, it is possible to project light to the light-reproduction medium 10 through the substrate 1 or the multi-layered structure 3, 4, and 5. Either lights reflected from the light-reproduction medium 10 or lights passing through the light-reproduction medium 10 may be used for detection.

Figure 2:
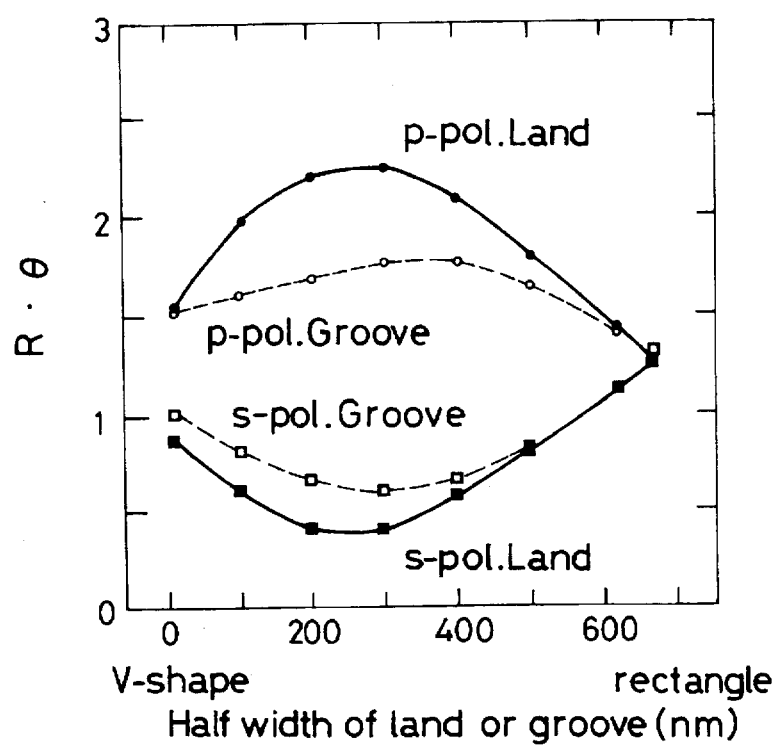
FIG. 2 shows the dependency of Rθ on a cross-sectional shape of a groove or land when a groove or land has a relatively wide width, wherein R represents an intensity of lights scattering from magnetic substance, and θ represents Kerr rotation angle the scattering lights.
Figure 6A:
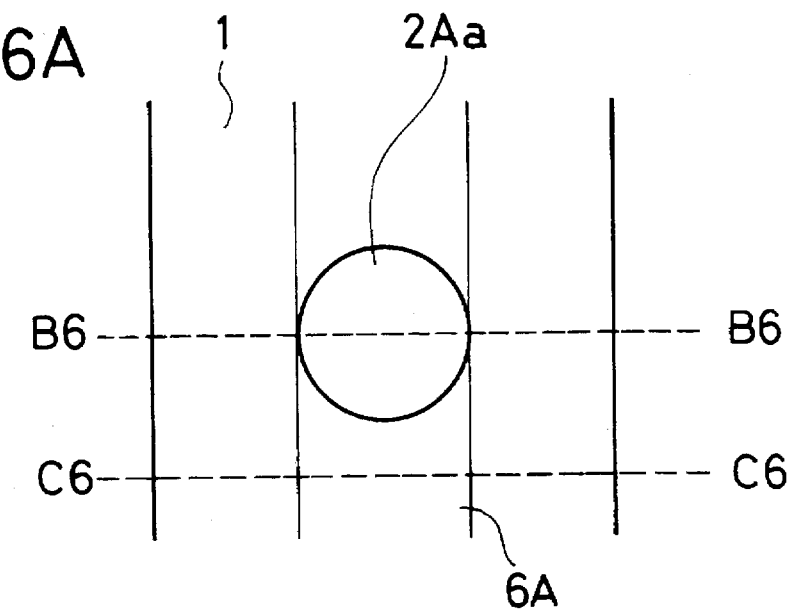
FIG. 6A is a plan view illustrating a variation of a recording pit illustrated in FIG. 4A.
Figure 6B:
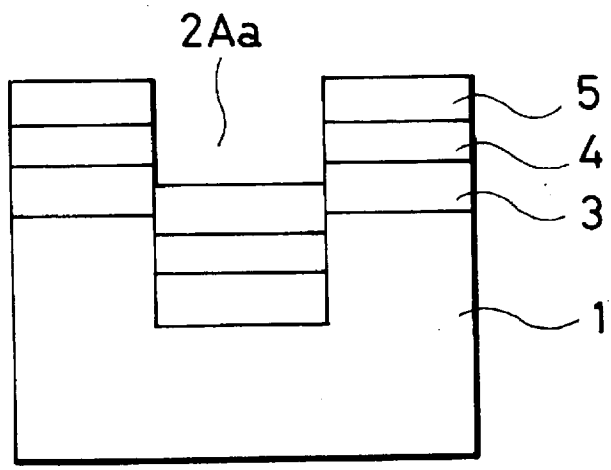
FIG. 6B is a cross-sectional view taken along the line B6—B6 in FIG. 6A.
Figure 6C:
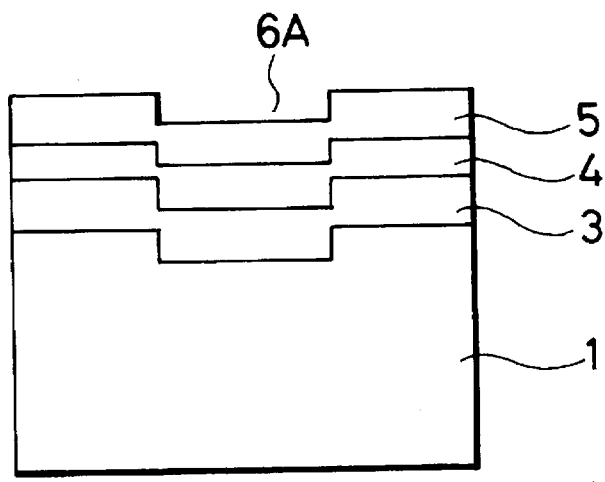
FIG. 6C is a cross-sectional view taken along the line C6—C6 in FIG. 6A.
Figure 7A:
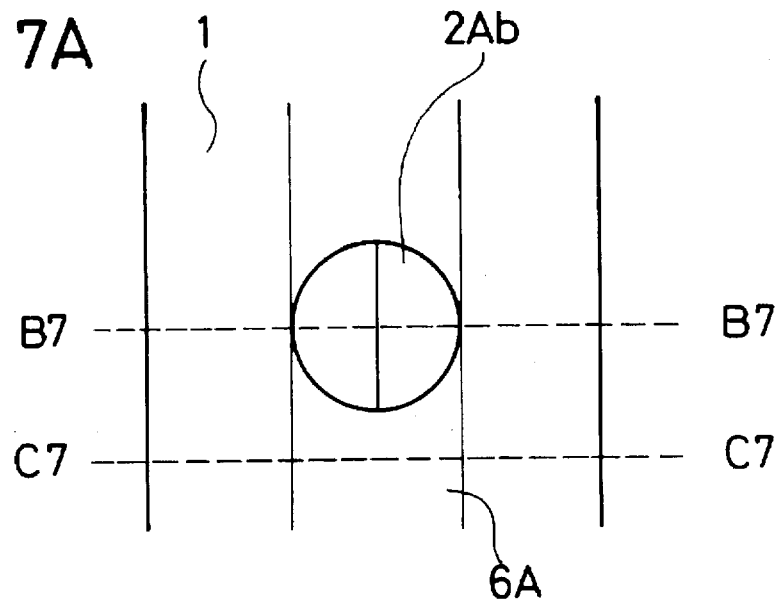
FIG. 7A is a plan view illustrating another variation of a recording pit illustrated in FIG. 4A.
Figure 7B:
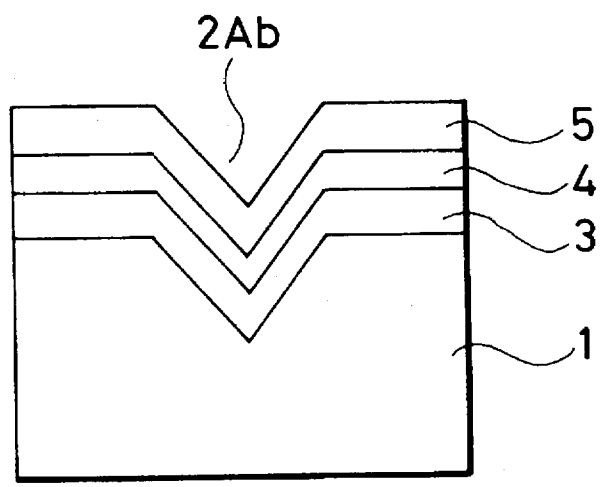
FIG. 7B is a cross-sectional view taken along the line B7—B7 in FIG. 7A.
Figure 7C:
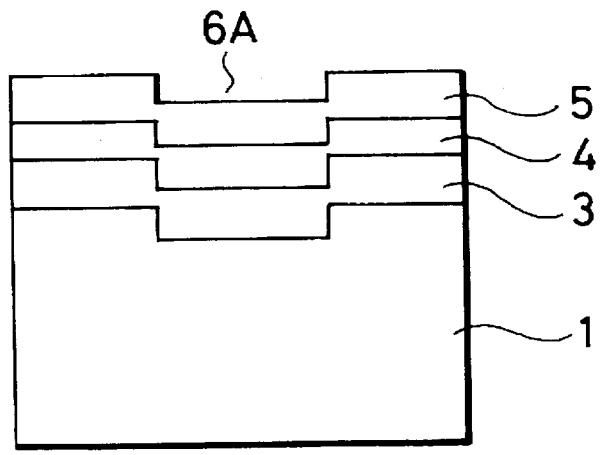
FIG. 7C is a cross-sectional view taken along the line C7—C7 in FIG. 7A.
Figure 8A:
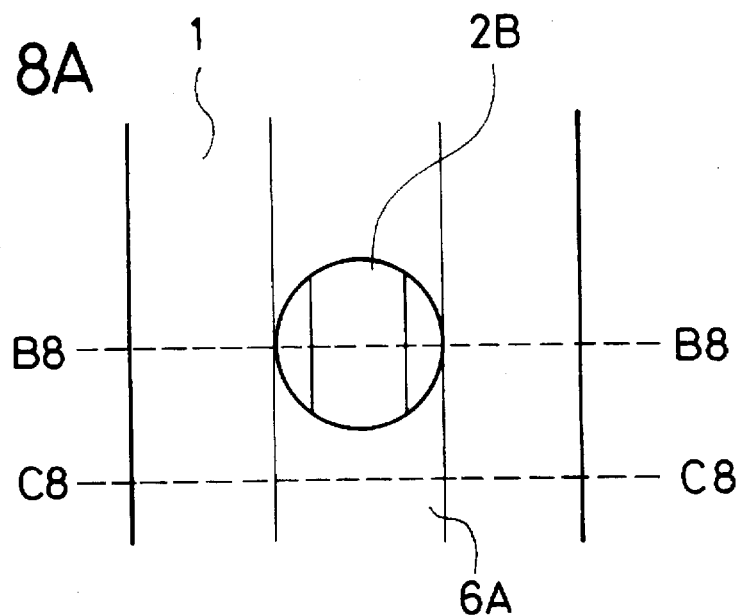
FIG. 8A is a plan view illustrating still another variation of a recording pit illustrated in FIG. 4A.
Figure 8B:
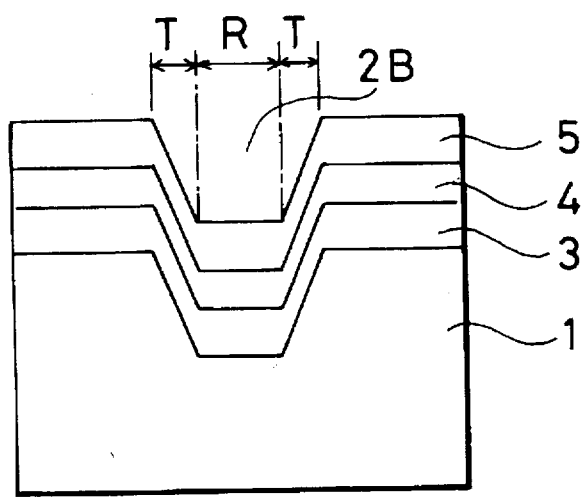
FIG. 8B is a cross-sectional view taken along the line B8—B8 in FIG. 8A.
Figure 8C:
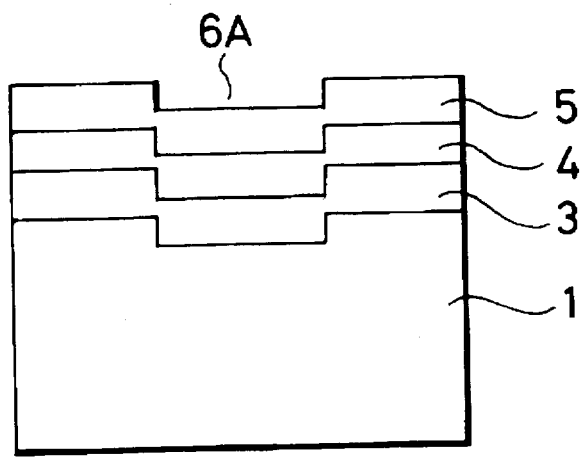
FIG. 8C is a cross-sectional view taken along the line C8—C8 in FIG. 8A.

The recording pits 2a and 2b having rectangular and V-shaped cross-section, respectively, and the second grooves 6 may have a greater width as measured in a direction perpendicular to the direction Y relative to a wavelength of an incident light, as illustrated in FIGS. 6A and 7A, to thereby utilize the characteristic shown in FIG. 2. For instance, a recording pit may have a rectangular cross-section 2A*a* or a V-shaped cross-section 2A*b* illustrated in FIGS. 6B and 7B, respectively, and the second groove may have a cross-section 6A illustrated in FIGS. 6C and 7C. As an alternative, a recording pit may have a cross-section having a shape intermediate between rectangle and V-shape. For instance, a recording pit may have a reverse trapezoidal cross-section 2B as illustrated in FIG. 8B, in which case, if a ratio of a width R of a flat portion to an entire width (R+2T) of the groove 2B is smaller than 80%, the groove 2B can be considered to be almost the same as a V-shaped groove.

Figure 9A:
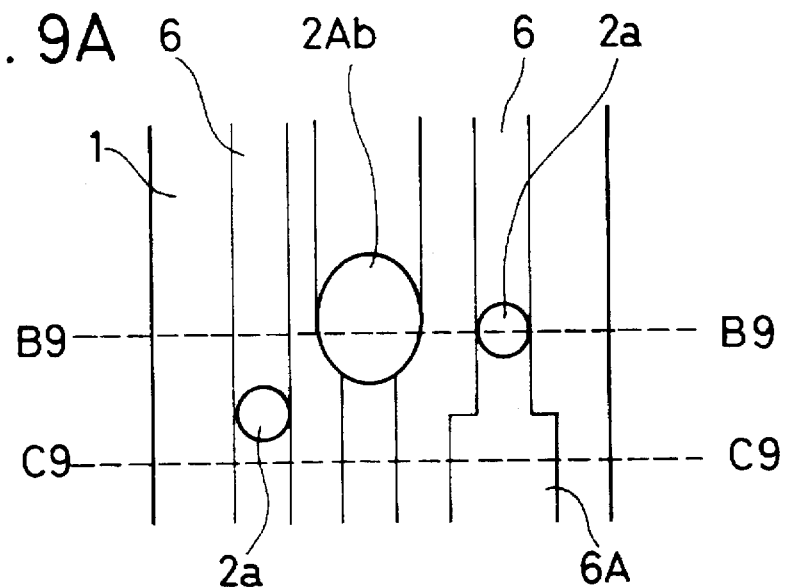
FIG. 9A is a plan view illustrating recording pits made in accordance with the second embodiment of the present invention.
Figure 9B:
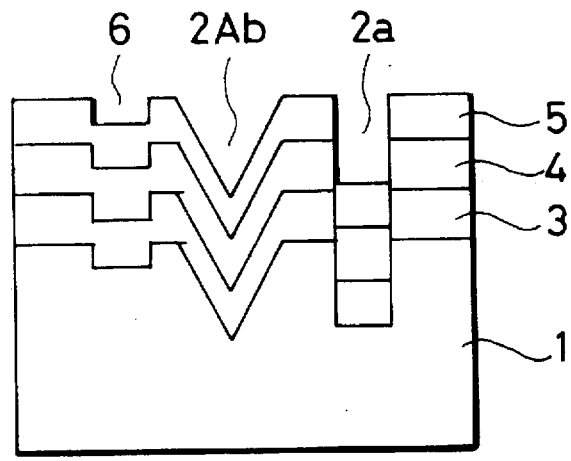
FIG. 9B is a cross-sectional view taken along the line B9—B9 in FIG. 9A.
Figure 9C:
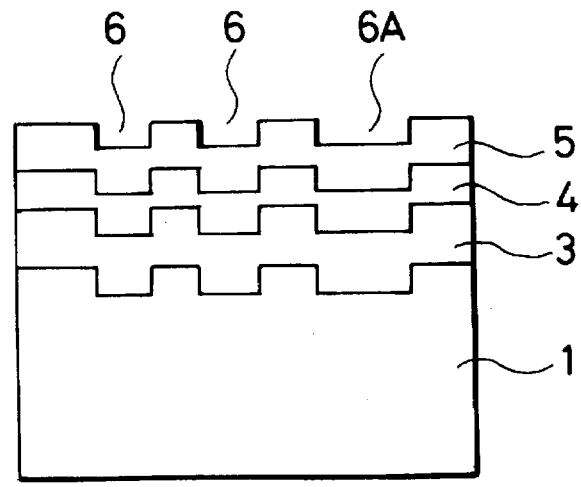
FIG. 9C is a cross-sectional view taken along the line C9—C9 in FIG. 9A.

FIGS. 9A to 9C illustrate the second embodiment which is a variation of the first embodiment. In this embodiment, a groove formed as the recording pits 2*a* and 2A*b* and the second grooves 6 and 6A formed in a region where the recording pits are not formed may have a varying width which is defined as a length measured in a direction perpendicular to the direction Y. Specifically, the second grooves 6 have a narrow width smaller than a half of a wavelength of an incident light, whereas the second groove 6A has a wide width greater than a half of a wavelength of an incident light. Thus, it is possible to detect a difference in width in the recording pits and second grooves by calculation in accordance with the equation (A+B)−(C+D), utilizing the characteristics shown in FIGS. 2 and 3, to thereby make it possible to further increase the multiplicity.

FIGS. 10A to 10C and 11A to 11C illustrate grooves formed as recording pits in accordance with the third embodiment of the present invention. The illustrated recording pits 2C have a cross-section asymmetrical about an axis passing through a center of the recording pits 2C and perpendicular to the direction Y. The recording pit 2C*a* illustrated in FIGS. 10A and 10B has a bottom inclined upwardly towards the center of the light-reproduction medium, whereas the recording pit 2C*b* illustrated in FIGS. 11A and 11B has a bottom inclined downwardly towards the center of the light-reproduction medium. The thus formed recording pits 2C*a* and 2C*b* bias incident lights to regions of the light-reproduction medium closer to or farther away from a center thereof in dependence on whether a bottom of the recording pits 2C*a* and 2C*b* is inclined upwardly or downwardly.

Thus, when the light-reproduction apparatus illustrated in FIG. 5 is used, there is generated a difference in detected optical intensity between the regions A, C closer to a center of the light-reproduction medium and the regions B, D farther away from a center of the light-reproduction medium in the first and second photodetectors 19 and 20 each of which is divided into two sections. Accordingly, it is possible to identify whether a recording pit has a cross-section illustrated in FIG. 10B or FIG. 11B by making calculations in accordance with the equation (A+C)−(B+D). Thus, it is possible to further increase the multiplicity of the light-reproduction medium by adding the shapes of the recording pits 2C*a* and 2C*b* to the configuration of the first embodiment.

Figure 10A:
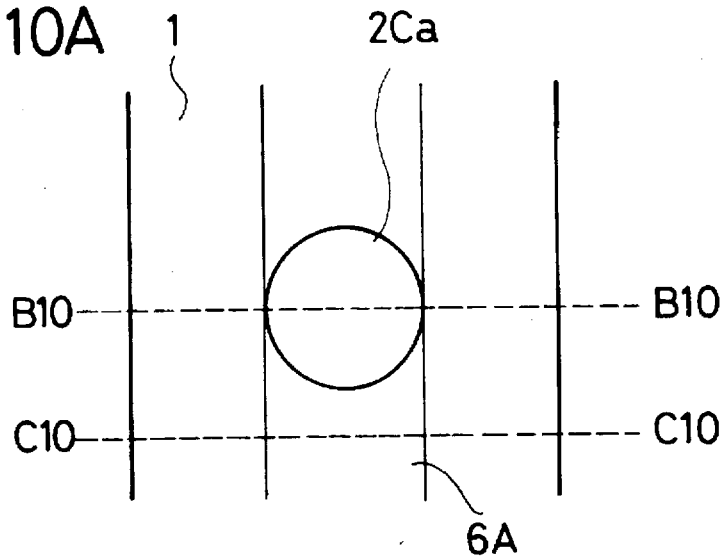
FIG. 10A is a plan view illustrating recording pits made in accordance with the third embodiment of the present invention.
Figure 10B:
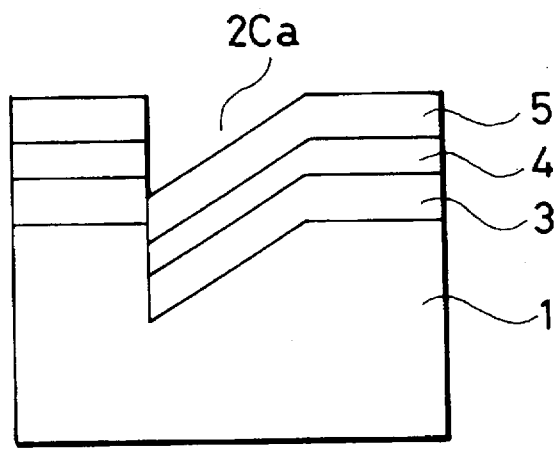
FIG. 10B is a cross-sectional view taken along the line B10—B10 in FIG. 10A.
Figure 10C:
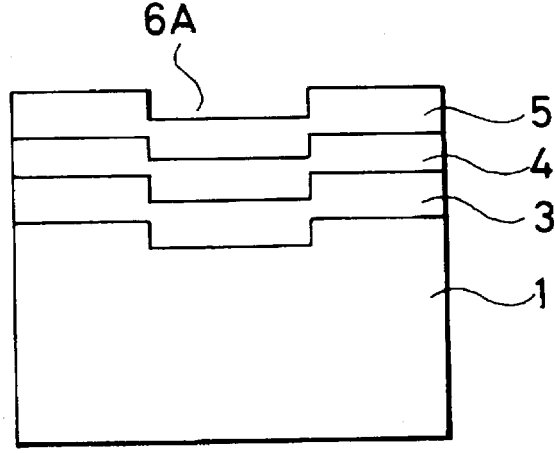
FIG. 10C is a cross-sectional view taken along the line C10—C10 in FIG. 10A.
Figure 11A:
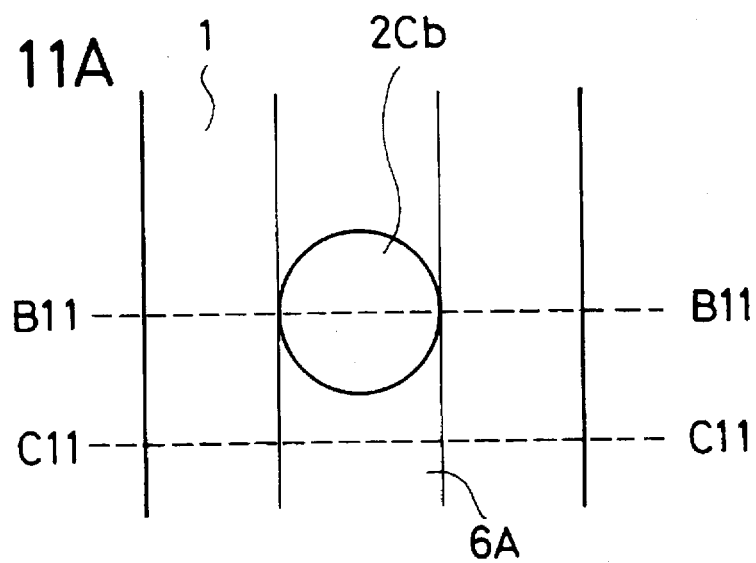
FIG. 11A is a plan view illustrating recording pits made in accordance with the third embodiment of the present invention.
Figure 11B:
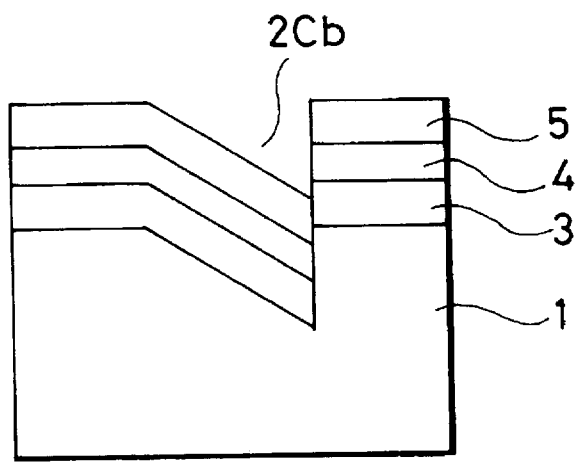
FIG. 11B is a cross-sectional view taken along the line B11—B11 in FIG. 11A.
Figure 11C:
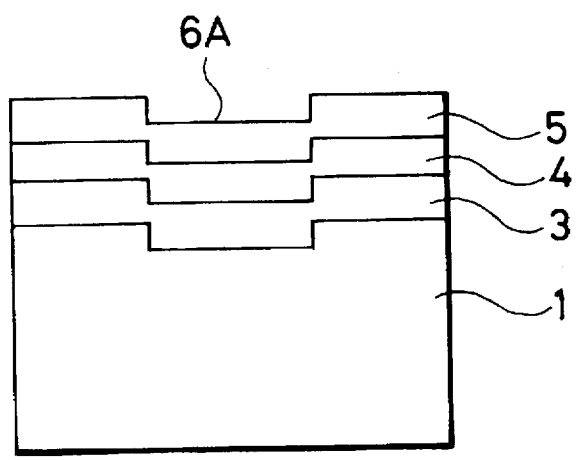
FIG. 11C is a cross-sectional view taken along the line C11—C11 in FIG. 11A.
Figure 12A:
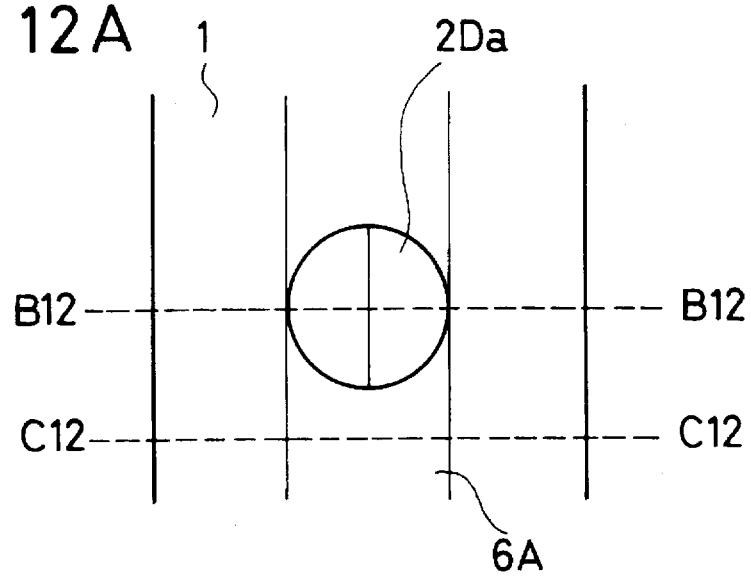
FIG. 12A is a plan view illustrating still recording pits made in accordance with the third embodiment of the present invention.
Figure 12B:
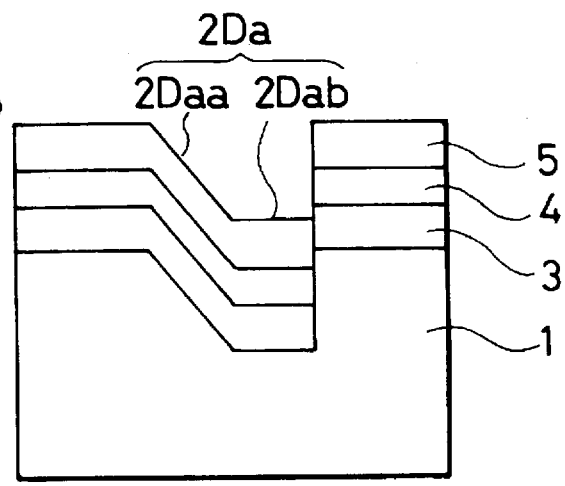
FIG. 12B is a cross-sectional view taken along the line B12—B12 in FIG. 12A.
Figure 12C:
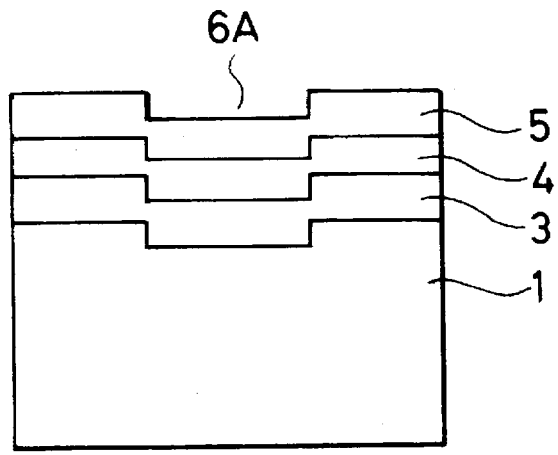
FIG. 12C is a cross-sectional view taken along the line C12—C12 in FIG. 12A.
Figure 13A:
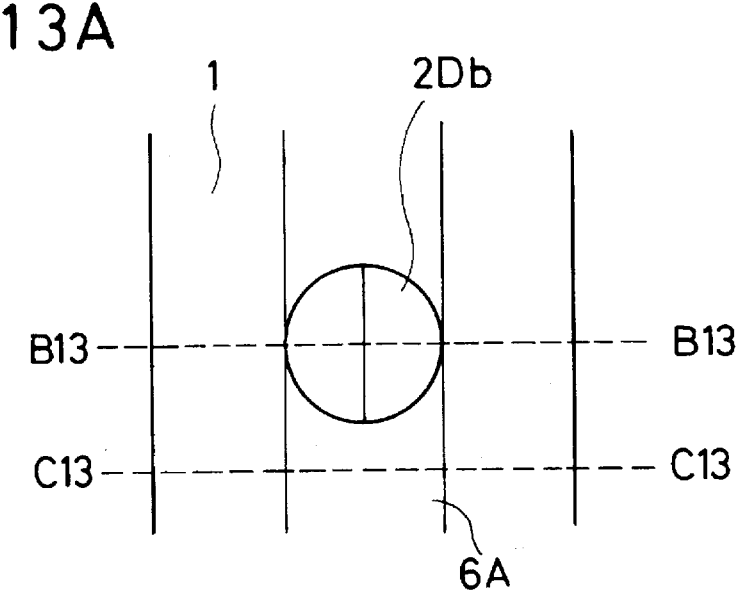
FIG. 13A is a plan view illustrating yet other recording pits made in accordance with the third embodiment of the present invention.
Figure 13B:
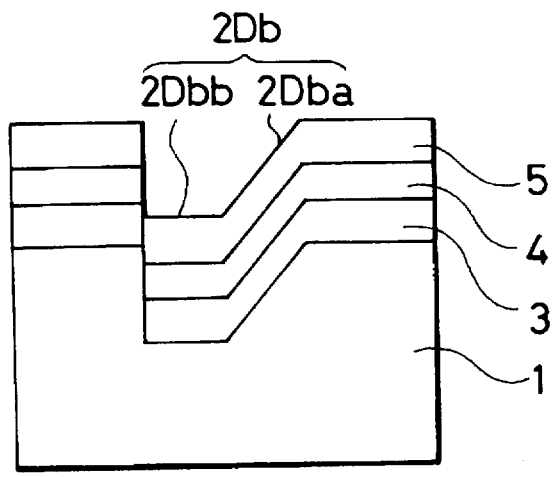
FIG. 13B is a cross-sectional view taken along the line B13—B13 in FIG. 13A.
Figure 13C:
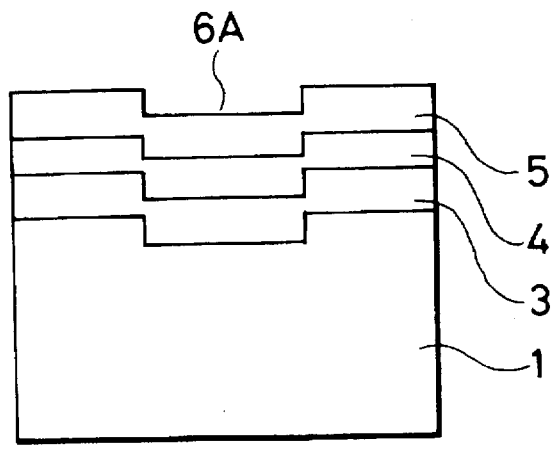
FIG. 13C is a cross-sectional view taken along the line C13—C13 in FIG. 13A.

It is possible to use recording pits 2D*a* and 2D*b* illustrated in FIGS. 12B and 13B, respectively, in place of the recording pits 2C*a* and 2C*b* illustrated in FIGS. 10B and 11B, respectively. The recording pit 2D*a* comprises a portion 2D*aa* inclined downwardly to the center of the light-reproduction medium, and a horizontally flat portion 2D*ab*, as illustrated in FIG. 12B, whereas the recording pit 2D*b* comprises a horizontally flat portion 2D*bb* and a portion 2D*ba* inclined upwardly to the center of the light-reproduction medium, as illustrated in FIG. 13B. If a ratio of a width of the flat portion 2D*ab* or 2D*bb* to an entire width of the groove 2D*a* or 2D*b* is smaller than 80%, the groove 2D*a* or 2D*b* can be considered to be almost the same as a V-shaped groove. Thus, it is preferable for the recording pits 2D*a* and 2D*b* to satisfy such a ratio with a value smaller than 80%.

Figure 3:
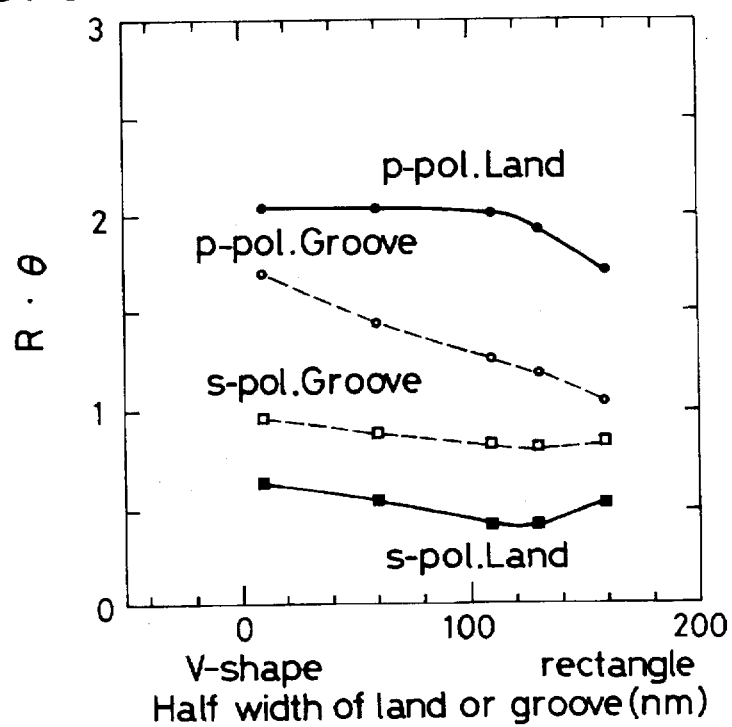
FIG. 3 shows the dependency of Rθ on a cross-sectional shape of a groove or land when a groove or land has a relatively narrow width.

Since the third embodiment has nothing to do with the characteristics as illustrated in FIGS. 2 and 3 caused due to a difference between s- and p-polarized lights, when only the recording pits 2D*a* or 2D*b* formed in accordance with the third embodiment are to be used, it is not necessary to deposit the magnetic film 4 on the substrate 1. All what is necessary is to deposit a reflection film on a substrate like conventional CD-ROM.

Hereinbelow are described more detailed examples.

An optical disc was made comprising a polycarbonate substrate having a diameter of 120 mm and multi-layers deposited on the substrate, including SiN interference film, TbFeCo magnetic film, SiN protection film and Al alloy reflection film. The light-reproduction apparatus illustrated in FIG. 5 was used as an optical system. The orientation of polarized lights to be radiated into the optical disc was set at 45 degrees relative to a direction in which the optical disc is to be moved relative to an optical head. An incident light had a wavelength of 680 nm. A plurality of grooves were formed as recording pits, some of them having a depth of 170 nm and others 21.25 nm. These grooves had rectangular or V-shaped cross-section or other shapes such as those illustrated in FIGS. 4A to 13C. On regeneration of data stored in the optical disc, all signals (A+B)−(C+D), (A+C)−(B+D) and (A+B+C+D) were clearly reproduced, and all these signals had almost the same quality as conventional CD-ROM. Thus, it has been confirmed that there has been obtained a light-reproduction medium having memory density four times greater than conventional CD-ROM.

There was made another optical disc having the same configuration as the previously mentioned optical disc except that grooves formed as recording pits have a depth of either 85 nm or 170 nm. On regeneration of data stored in the optical disc, all signals (A+B)−(C+D), (A+C)−(B+D) and (A+B+C+D) were clearly reproduced, and all these signals had almost the same quality as conventional CD-ROM. Thus, it has been confirmed that there has been obtained a light-reproduction medium having memory density four times greater than conventional CD-ROM.

There was made still another optical disc having the same configuration as the firstly mentioned optical disc except that grooves formed as recording pits have a depth of either 170 nm or 340 nm. On regeneration of data stored in the optical disc, all signals (A+B)−(C+D), (A+C)−(B+D) and (A+B+C+D) were clearly reproduced, and all these signals had almost the same quality as conventional CD-ROM. Thus, it has been confirmed that there has been obtained a light-reproduction medium having memory density four times greater than conventional CD-ROM.

There was made yet another optical disc having the same configuration as the firstly mentioned optical disc except that grooves formed as recording pits have a depth of either 170 nm or 21.25 nm. Some of these grooves had rectangular cross-section 2*a* and others had V-shaped cross-sections 2A*b* as illustrated in FIG. 9B, and some of the grooves had a width of 680 nm and others 340 nm. On regeneration of data stored in the optical disc, signals (A+B)−(C+D) and (A+B+C+D) were clearly reproduced, and these signals had almost the same quality as conventional CD-ROM. Thus, it has been confirmed that there has been obtained a light-reproduction medium having memory density twice greater than conventional CD-ROM.

The same experiment was conducted to an optical card having been made in accordance with the same specification as the above mentioned optical disc. The same results were obtained, and thus the effectiveness of the optical card was confirmed. It has been also confirmed that the same results could be obtained not only when the optical disc or card was moved relative to an optical head, but also when an optical head was moved relative to the optical disc or card.

Although the recording pits are formed as grooves and the second grooves are formed in the above mentioned embodiments, it should be noted that a land or lands may be formed in place of a groove or grooves. When a land or lands are formed, there may be used the upside down forms of the shapes illustrated in FIGS. 4A to 13C. It is not always necessary to form grooves or lands having more than two different cross-sections. One groove or land may be formed as a recording pit. In addition, it is possible to form both a groove or grooves and a land or lands. It is also possible to form both grooves having more than two different cross-sections and lands having more than two different cross-sections.

It is not always necessary to concurrently project s- and p-polarized lights into the light-reproduction medium. The s- and p-polarized lights may be projected alternately for regeneration of data.

Thus, the present invention provides a light-reproduction medium having memory density several times greater than a conventional CD-ROM without changing CD-ROM fabrication technique, driving method and an optical head structure, resulting in significantly increased capacity of an optical disc or an optical card.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A light-reproduction medium, data stored therein being reproduced by detecting at least one of light transmitted therethrough and light reflected therefrom, said light-reproduction medium comprising:

a substrate formed on a surface thereof with at least two recording pits having different level from said surface of said substrate, each of said recording pits having a cross-section selected from at least two different shapes, said cross-section being defined as viewed in a direction perpendicular to a direction Y in which said light-reproduction medium is moved relative to an optical head, at least two recording pits among said recording pits being asymmetrical in shape about an axis passing through a midpoint thereof and parallel to said direction Y.

2. The light-reproduction medium as set forth in claim 1, wherein one of said recording pits has a cross-section, as viewed in a direction perpendicular to said direction Y, which has an upper edge inclined upward towards a center of said light-reproduction medium.

3. The light-reproduction medium as set forth in claim 1, wherein one of said recording pits has a cross-section, as viewed in a direction perpendicular to said direction Y, which has an upper edge inclined downward towards a center of said light-reproduction medium.

4. The light-reproduction medium as set forth in claim 1, wherein said recording pits are shaped in a groove or a land.

5. The light-reproduction medium as set forth in claim 1, wherein said substrate is formed on a surface thereof with second lands or grooves in a region in which said recording pits are not formed, said second lands or grooves extending in a direction in which said light-reproduction medium is moved relative to an optical head and having a different level from said recording pits.

6. The light-reproduction medium as set forth in claim 5, wherein each of said second lands or grooves is continuous with each of said recording pits. direction Y; and a magnetic film formed on said surface of said substrate.

7. A light-reproduction medium, data stored therein being reproduced by detecting at least one of light transmitted therethrough and light reflected therefrom, said light-reproduction medium comprising:

a substrate formed on a surface thereof with at least two recording pits having different level from said surface of said substrate, each of said recording pits having a cross-section selected from at least two different shapes, said cross-section being defined as viewed in a direction Y perpendicular to a direction in which said light-reproduction medium is moved relative to an optical head, each of said recording pits having a width selected from at least two different ones, said width being defined as viewed in said direction Y, at least two recording pits among said recording pits being asymmetrical in shape about an axis passing through a midpoint thereof and parallel to said direction Y; and a magnetic film formed on said surface of said substrate.

8. The light-reproduction medium as set forth in claim 7, wherein one of said recording pits has a cross-section, as viewed in a direction perpendicular to said direction Y, which has an upper edge inclined upward towards a center of said light-reproduction medium.

9. The light-reproduction medium as set forth in claim 7, wherein one of said recording pits has a cross-section, as viewed in a direction perpendicular to said direction Y, which has an upper edge inclined downward towards a center of said light-reproduction medium.

* * * * *

UNITED STATES PATENT AND TRADEMARK OFFICE
CERTIFICATE OF CORRECTION

PATENT NO. : 5,724,339
DATED      : March 3, 1998
INVENTOR(S) : Masatsugu Ogawa

It is certified that error appears in the above-identified patent and that said Letters Patent is hereby corrected as shown below:

Claim 6, Col. 14, lines 24 and 25, please delete "direction Y; and a magnetic film formed on said surface of said substrate."

Signed and Sealed this

Eighth Day of December, 1998

Attest:

BRUCE LEHMAN

Attesting Officer

Commissioner of Patents and Trademarks